United States Patent
Chan et al.

(10) Patent No.: US 10,242,575 B1
(45) Date of Patent: Mar. 26, 2019

(54) MARKED PARKING SPACE IDENTIFICATION SYSTEM AND METHOD THEREOF

(71) Applicant: INDUSTRIAL TECHNOLOGY RESEARCH INSTITUTE, Hsinchu (TW)

(72) Inventors: Sheng-Wei Chan, Hsinchu (TW); Yu-Chung Chen, Hsinchu (TW); Chantel Lin, Hsinchu (TW); Pin-Yung Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/832,937

(22) Filed: Dec. 6, 2017

(30) Foreign Application Priority Data

Dec. 5, 2017 (TW) .............................. 106142571 A

(51) Int. Cl.
*G08G 1/00* (2006.01)
*G08G 1/14* (2006.01)

(52) U.S. Cl.
CPC ............. *G08G 1/143* (2013.01); *G08G 1/142* (2013.01); *G08G 1/148* (2013.01); *B60W 2420/403* (2013.01)

(58) Field of Classification Search
CPC ................................... G06F 1/00; G06T 1/00
See application file for complete search history.

(56) References Cited

U.S. PATENT DOCUMENTS

| 5,530,420 A | * | 6/1996 | Tsuchiya | G01S 11/12 340/435 |
| 9,363,483 B2 | | 6/2016 | Bulan et al. | |
| 2002/0041239 A1 | * | 4/2002 | Shimizu | B60R 1/00 340/932.2 |
| 2012/0265404 A1 | * | 10/2012 | Kim | B60W 30/06 701/43 |
| 2015/0073660 A1 | | 3/2015 | Lee | |

(Continued)

FOREIGN PATENT DOCUMENTS

| CN | 1846149 | 10/2006 |
| CN | 101426669 | 5/2009 |
| CN | 105355083 | 2/2016 |
| TW | 200910278 | 3/2009 |

(Continued)

OTHER PUBLICATIONS

Li, et al. "Implementation of an Autonomous Driving System for Parallel and Perpendicular Parking", System Integration (SII), 2016 IEEE/SICE International Symposium, 2016/12, 13-15.

(Continued)

*Primary Examiner* — Shirley Lu
(74) *Attorney, Agent, or Firm* — Amin, Turocy & Watson LLP

(57) ABSTRACT

A marked parking space identification system and a marked parking space identification method are disclosed. The marked parking space identification method includes: receiving a first image of a first parking space with markings; identifying a plurality of corners in the first image of the first parking space with markings; pairing up two adjacent corners to become a parking corner group; and using the parking corner group to identify a first marked parking space.

22 Claims, 7 Drawing Sheets

(56) References Cited

U.S. PATENT DOCUMENTS

| | | | |
|---|---|---|---|
| 2015/0127217 A1* | 5/2015 | Lee | B60W 30/06 701/36 |
| 2016/0078764 A1 | 3/2016 | Kiyokawa et al. | |
| 2016/0148514 A1 | 5/2016 | Iwami et al. | |

FOREIGN PATENT DOCUMENTS

| | | |
|---|---|---|
| TW | 1347900 | 9/2011 |
| TW | 201413674 | 4/2014 |
| WO | 2017/021601 | 2/2017 |

OTHER PUBLICATIONS

Jung, et al. "Parking Slot Markings Recognition for Automatic Parking Assist System", IEEE Intelligent Vehicles Symposium, 2006/6, 13-15.

Krasner, et al. "Automatic Parking Identiication and Vehicle Guidance with Road Awareness", IEEE International Conference on the Science of Electrical Engineering (ICSEE) 2016/11, 1-5.

Wang, et al. "Automatic Parking Based on a Bird's Eye View Vision System", SAGE Journals on Advances in Mechanical Engineering, 2014/1, 13.

Xu, et al. "Vision-Guided Automatic Parking for Smart Car", Proceedings of the 2000 IEEE Intelligent Vehicles Symposium, 2000/10, 725-730.

Aye, et al. "Generation of Time-varying Target Lines for an Automatic Parking System Using Image-based Processing", Proceedings of the 2015 IEEE Conference on Robotics and Biomimetics (ROBIO), 2015*12, 423-427.

Taiwanese Decision to Grant a Patent for Taiwanese Patent Application No. 106142571 dated Aug. 3, 2018.

Parking—Real-Time Parking Space Monitor and Guiding System with Cloud Service.

* cited by examiner understand the advantages and effects of the present disclosure upon reading the disclosure of this specification. However, the present disclosure may also be practiced or applied in other different implementations.
MARKED PARKING SPACE IDENTIFICATION SYSTEM AND METHOD THEREOF

CROSS-REFERENCE TO RELATED APPLICATION

The present disclosure is based on, and claims priority from, Taiwan Application Number 106142571, filed Dec. 5, 2017, the disclosure of which is hereby incorporated by reference herein in its entirety.

BACKGROUND

1. Technical Field

The present disclosure relates to parking space identification systems and parking space identification methods, and, more particularly, to a parking space identification system and a parking space identification method using image recognition.

2. Description of Related Art

There has been rapid developments in the technology for driverless vehicle and various vehicle manufacturers have been putting their focus on the research and development of driverless vehicle techniques. Automatic or semi-automatic parking techniques have been one of the major area of focus.

The automatic or semi-automatic parking techniques in driverless vehicle technology typically use distance sensors to detect parking spaces. A distance sensor is usually an ultrasonic sensor or a radar sensor. However, when a distance sensor to detect a parking space is used, obstacles have to be present on both sides of the parking space, and the obstacles have to be of certain heights, or else when the car is being maneuvered into the parking space, errors may occur when the parking space is identified due to these obstacles.

Another way of detecting a parking space employs image recognition to identify line markings on the ground laid out for the parking spaces in order to select a desired parking space. However, in the current parking space image recognition method, a line marking for a roadside parking space is selected first, and intersections of vertical lines on the line marking are then identified and combined to detect a parking space. In other words, this type of image recognition method can only be used to identify a plurality of adjacent parking spaces concatenated together without causing misjudgment, and is not capable of identifying a single isolated parking space.

As mentioned above, the current techniques of detecting parking spaces require the presence of either obstacles or a plurality of adjacent and concatenated parking spaces, resulting in limited applications of said techniques.

SUMMARY

The present disclosure provides a marked parking space identification method, which may include: receiving a first image of a first parking space with markings; identifying a plurality of corners in the first image of the first parking space with markings; pairing up two adjacent corners to be a parking corner group; and identifying a first marked parking space based on the parking corner group.

The present disclosure further provides a marked parking space identification system, which may include: at least an image capturing device for capturing a first image of a first parking space with markings; and a parking space identification module electrically connected with the image capturing device for performing a marked parking space identification method. The marked parking space identification method may include: receiving a first image of a first parking space with markings; identifying a plurality of corners in the first image of the first parking space with markings; pairing up two adjacent corners to be a parking corner group; and identifying a first marked parking space based on the parking corner group.

DETAILED DESCRIPTION

The technical content of the present disclosure is described by the following specific embodiments. One with ordinary skill in the art can readily understand the advantages and effects of the present disclosure upon reading the disclosure of this specification. However, the present disclosure may also be practiced or applied in other different implementations.

Figure 1:
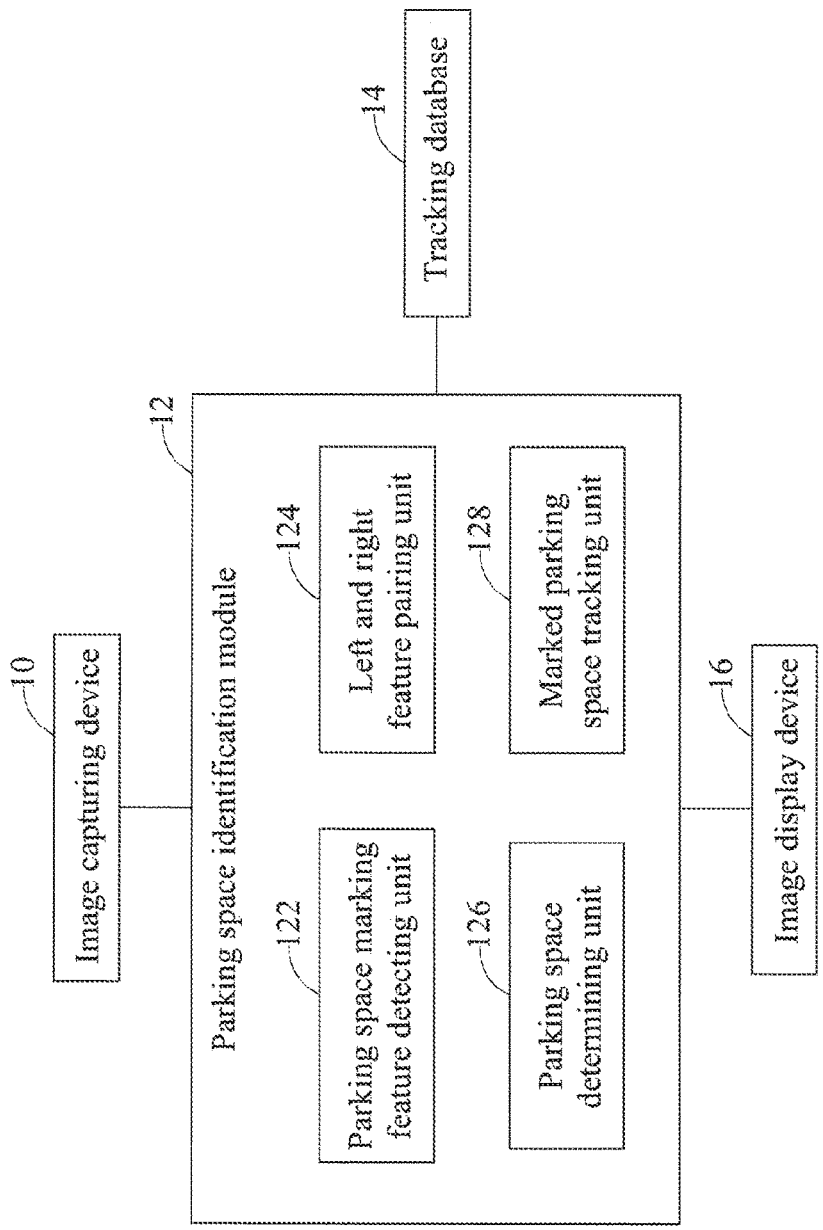
FIG. 1 is a block diagram depicting a marked parking space identification system in accordance with the present disclosure.

FIG. 1 is a block diagram depicting a marked parking space identification system in accordance with the present disclosure. The marked parking space identification system can be integrated into a vehicle electronic system or installed as a standalone, and includes an image capturing device 10, a parking space identification module 12, a tracking database 14, and an image display device 16, wherein the image capturing device 10, the tracking database 14, and the image display device 16 are all electrically connected with the parking space identification module 12.

Figure 2:
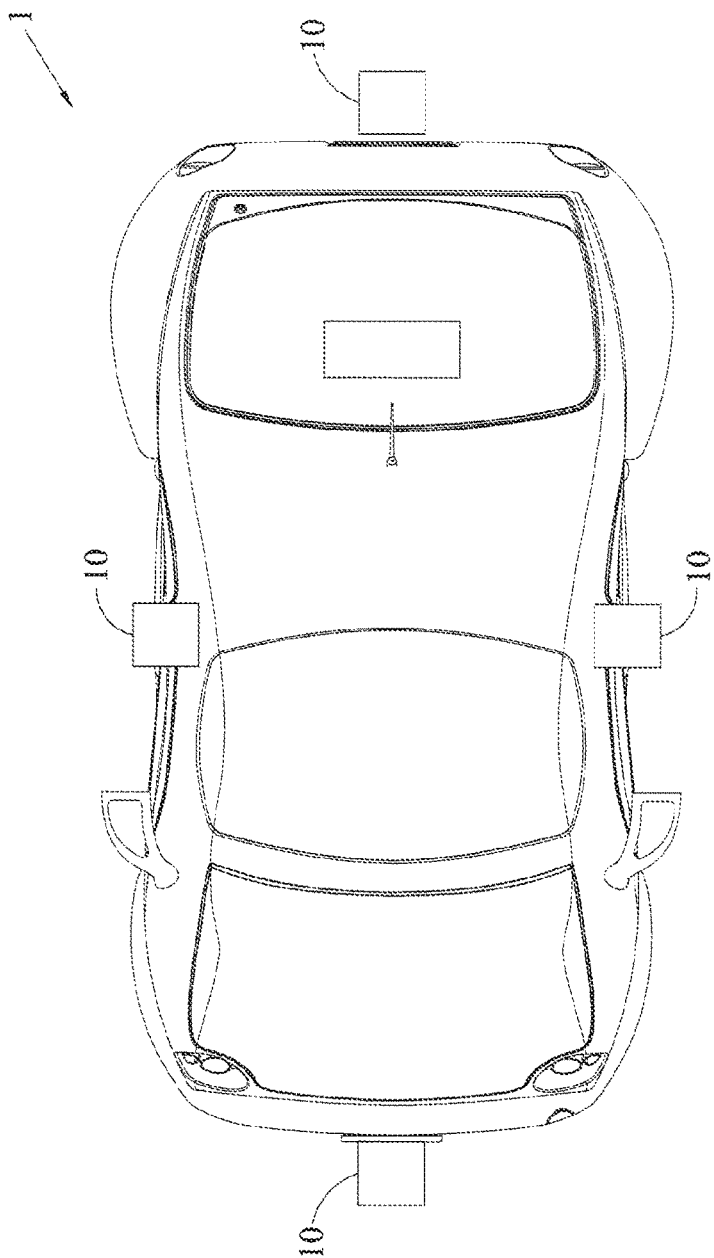
FIG. 2 is a schematic diagram depicting installation locations of image capturing devices of the marked parking space identification system in accordance with the present disclosure.

With reference to FIG. 2, a schematic diagram depicting installation locations of an image capturing device of the marked parking space identification system in accordance with the present disclosure is shown. In an embodiment, the image capturing device 10 can be provided at four positions (the front, back, left, or right) of a vehicle 1. In other embodiments, the image capturing device 10 may also adopt a wide-angle lens, which can be provided on the front, back or top of the vehicle 1.

Figure 3:
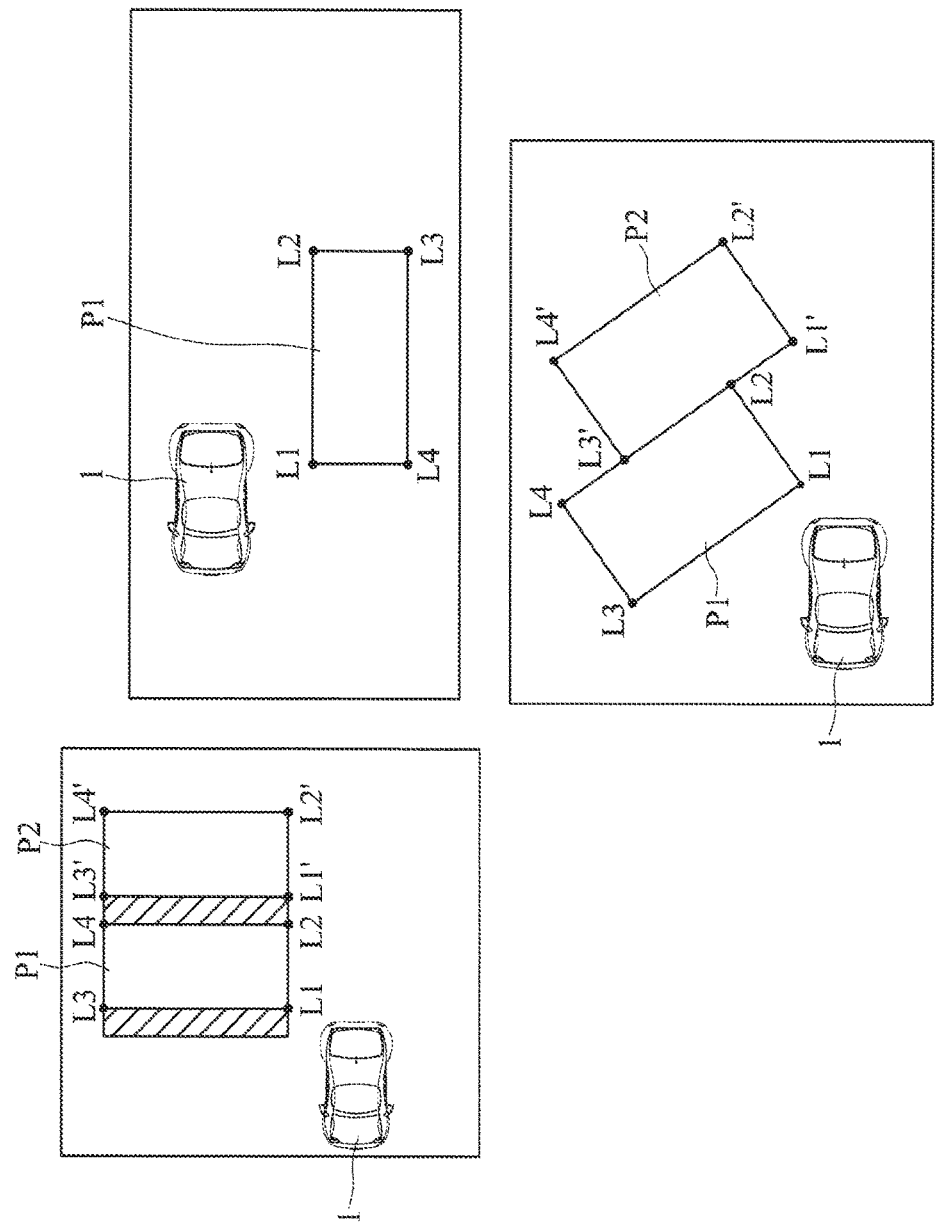
FIG. 3 is a schematic diagram depicting different parking space arrangements that can be identified by the marked parking space identification system in accordance with the present disclosure.

With further reference to FIG. 3, a schematic diagram depicting different parking space arrangements that can be identified by the marked parking space identification system in accordance with the present disclosure is shown. As illustrated, the present disclosure is at least suitable for parallel parking, perpendicular parking and angled parking. It should be noted that these three parking methods do not restrict whether a vehicle is pulled straight in or reversed into a parking space. A typical parking space is rectangular with four corners L1-L4 or L1'-L4', wherein corners L1 and L2 are two adjacent ones of the four corners closest to of the vehicle 1.

In an embodiment, the image capturing device 10 of the marked parking space identification system according to the present disclosure is a video recording device with a lens for capturing a first image of a first parking space with markings. As shown in FIG. 3, when the vehicle 1 is near to a first parking space P1, the image capturing device 10 captures an image of the first parking space P1 and its surrounding, and sends the image data to the parking space identification module 12.

The parking space identification module 12 includes a parking space marking feature detecting unit 122, a left and right feature pairing unit 124, a parking space determining unit 126 and a marked parking space tracking unit 128, wherein the parking space marking feature detecting unit 122 further includes a corner detector for detecting corners of a parking space. In other words, when the image capturing device 10 captures and transmits an image of the first parking space P1 and its surrounding to the parking space identification module 12, the parking space identification module 12 uses the corner detector in the parking space marking feature detecting unit 122 to identify four corners L1-L4 of the first parking space P1 while filtering out the surrounding, wherein the corner detector can be trained using a machine learning algorithm to help identify the corners in the image of the parking space with markings.

Figure 4:
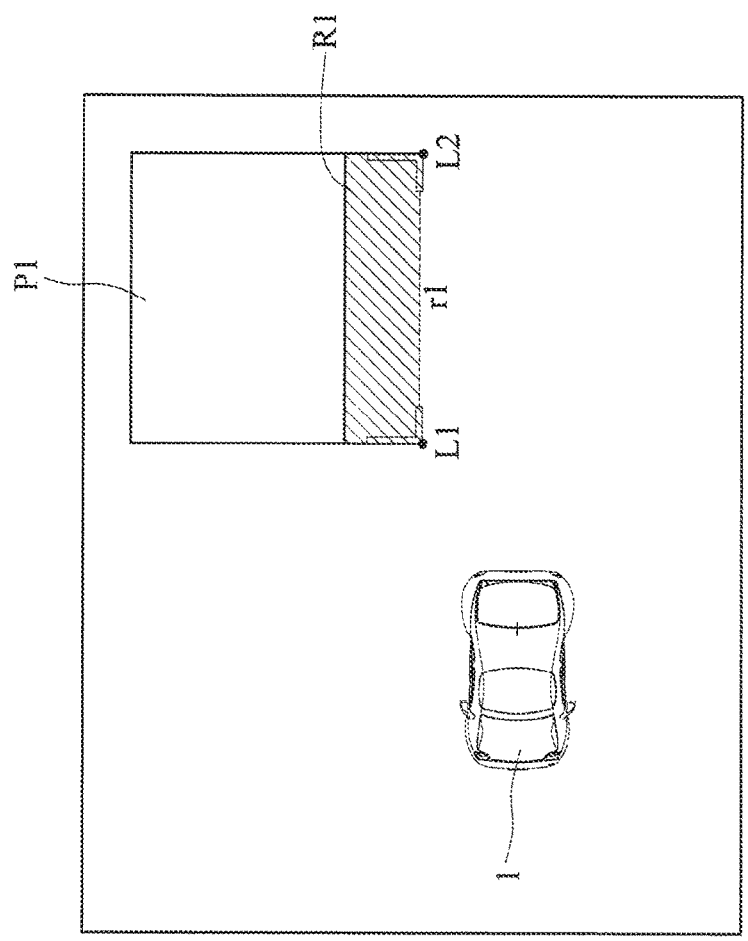
FIG. 4 is a schematic diagram depicting the location of a first region of interest determined by the marked parking space identification system in accordance with the present disclosure.

With reference to FIG. 4, a schematic diagram depicting the location of a first region of interest determined by the marked parking space identification system in accordance with the present disclosure is shown. Once the parking space marking feature detecting unit 122 has identified the corners L1-L4 on the first parking space P1, the corners L1-L4 are sent to the left and right feature pairing unit 124. After receiving the corner information, the left and right feature pairing unit 124 pair up two corners (e.g., two adjacent corners L1 and L2 of the first parking space P1) with a specific corresponding relationship into a parking corner group based on a predetermined spatial parameter of vehicles, wherein the two adjacent corners L1 and L2 correspond to each other and are supplementary angles. In other words, the two adjacent corners L1 and L2 have a sum of 180°.

Thereafter, the parking space determining unit 126 uses the relative location information of the parking corner group to determine whether the space in which the parking corner group is in is a first marked parking space.

In some embodiments, location information of the first marked parking space is calculated based on a lens parameter inputted in advance.

In some embodiments, after the parking space determining unit 126 receives the parking corner group information, a space encompassing the corners L1 and L2 of the parking corner group is set as a first region of interest R1, and corner point and location information of the corners L1 and L2 in the first region of interest R1 can be further identified to determine the first marked parking space. In other embodiments, the parking space determining unit 126 further identifies if there is a line r1 between the corners L1 and L2 of the parking corner group in the first region of interest R1. If so, the space delineated by the corners L1 and L2 and the line r1 is determined to be a first marked parking space. In other words, the parking space determining unit 126 is used for determining the range of the first region of interest R1, which is then used to determine the location of a first marked parking space.

As can be seen from the above, the parking space determining unit 126 only needs to determine the relative location information of the parking corner group in order to determine whether the location space the parking corner group is in is a first marked parking space. Alternatively, the parking space determining unit 126 further uses the first region of interest R1 to determine the location of a first marked parking space. As the area of the first region of interest R1 is much smaller than the entire area of the first marked parking space, when the parking space identification module 12 is trying to identify the location of the first marked parking space, identification time can be effectively reduced while at the same time reducing the consumption of system resources.

In some embodiments, the parking space identification module 12 further includes a marked parking space tracking unit 128 for tracking a single or a plurality of parking spaces. For example, when the marked parking space tracking unit 128 is only tracking a single parking space, the marked parking space tracking unit 128 may store information on the first marked parking space in a tracking database 14 for use in subsequent tracking. Thereafter, the marked parking space tracking unit 128 tracks and compares a feature pair-up value between the first image of the first parking space with markings at the current moment and the first image of the first parking space with markings at the previous moment (e.g., the similarity between the corners L1 and L2 at the current moment and the previous moment), and determines subsequent actions based on a relationship between the feature pair-up value and a predetermine threshold.

In some embodiments, when the feature pair-up value is greater than or equal to the predetermined threshold, the marked parking space tracking unit 128 calculates and outputs the current location information of the first marked parking space. In some embodiments, when the feature pair-up value is smaller than the predetermined threshold, the marked parking space tracking unit 128 stores the data of the first marked parking space in the tracking database 14. When the continuous duration in which the first marked parking space is stored in the tracking database 14 is greater than a predetermined continuous storage duration and there has been no updates on the location information of the first marked parking space, it is implied that the stored first marked parking space may well have left the capture screen of the image capturing device 10 a long time ago, so the marked parking space tracking unit 128 deletes this data.

In some other embodiments, when the feature pair-up value is smaller than the predetermined threshold, and when the continuous duration in which the first marked parking space is stored in the tracking database 14 is not greater than a predetermined continuous storage duration and there has been no updates on the location information of the first marked parking space, it is implied that the image capturing device 10 may be temporarily not able to capture continuous image data of the first marked parking space due to changes in light and shadows or obstruction of sight. At this time, the marked parking space tracking unit 128 activates a tracking algorithm to calculate the location information of the first marked parking space (e.g., the relative distance between the vehicle 1 and the first marked parking space). For example, the tracking algorithm may proportionally adjust the location information of the first marked parking space at the previous moment to obtain location information of the first marked parking space at the current moment. The tracking algorithm can be implemented using traditional tracking techniques, such as a Kalman filter, but the present disclosure is not so limited. In other words, when the parking space identification module 12 is temporarily unable to identify a parking space due to changes in light and shadow or sight obstruction, the marked parking space tracking unit 128 can be used to assist in the identification of the parking space by initiating the tracking algorithm to calculate the relative distance between the marked parking space and the vehicle.

Figure 5:
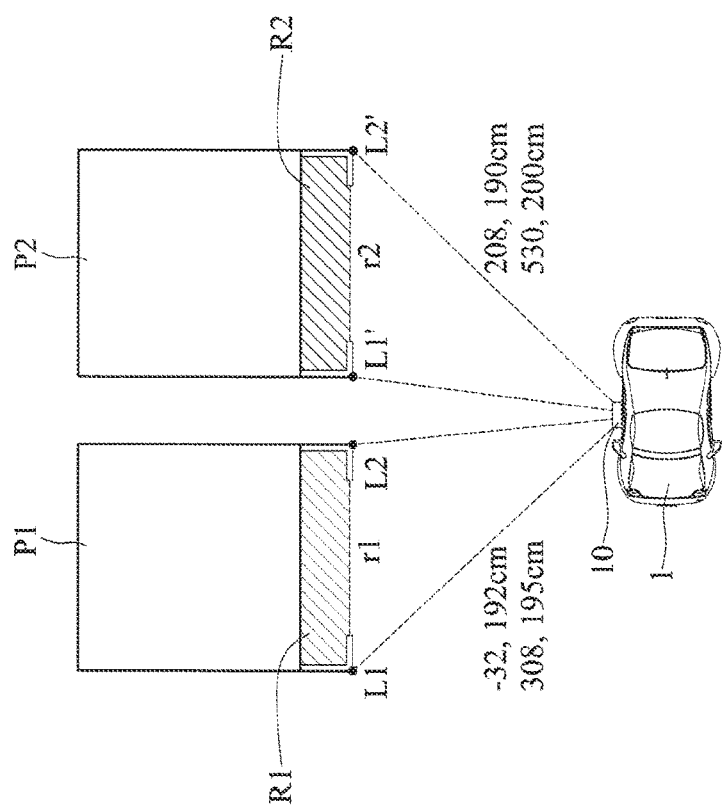
FIG. 5 is a schematic diagram depicting relative location information of first and second marked parking spaces with respect to the image capturing device in accordance with the present disclosure.

In some embodiments, the parking space identification module 12 can also be used for identifying "a plurality of" parking spaces. Two parking spaces are used as an example in the following descriptions. With reference in conjunction with FIG. 5, a schematic diagram depicting relative location information of a first parking space P1 (first marked parking space) and a second parking space P2 (second marked parking space) with respect to the image capturing device 10 is shown. As shown in FIG. 5, the image capturing device 10 may simultaneously capture an image including the first parking space P1 (first marked parking space), the second parking space P2 (second marked parking space) and their surroundings; the parking space marking feature detecting unit 122 then employs the corner detector to identify a plurality of corners on the first parking space P1 (first marked parking space) and the second parking space P2 (second marked parking space); the left and right feature pairing unit 124, upon receiving the corner information, pairs up two adjacent corners L1 and L2 on the first parking space P1 (first marked parking space) and two adjacent corners L1' and L2' on the second parking space P2 (second marked parking space) as two sets of parking corner groups; the parking space determining unit 126, upon receiving the plurality of parking corner group information, first identifies a first region of interest R1 on the first parking space P1 (first marked parking space) and a second region of interest R2 on the second parking space P2 (second marked parking space) to assist the parking space identification module 12 in determining the first marked parking space and the second marked parking space; and the marked parking space tracking unit 128 uses feature pair-up values between the first image of the first parking space P1 with markings (first marked parking space) and the second image of the second parking space P2 with markings (second marked parking space) (e.g., the similarities between the corners L1, L2, L1' and L2' at the current moment and the previous moment) to track and compare the first marked parking space and the second marked parking space at the current moment with the first marked parking space and the second marked parking space at the previous moment. When the feature pair-up values are greater than or equal to a predetermined threshold in the marked parking space identification system according to the present disclosure, the marked parking space tracking unit 128 calculates and outputs location information of the first marked parking space and the second marked parking space at the current moment (e.g., the relative distance between the first marked parking space and the second marked parking space with respect to the vehicle 1).

In some embodiments, if the marked parking space tracking unit 128 determines that at least a feature pair-up value (e.g., the feature pair-up value between the second marked parking space at the current moment and the second marked parking space at the previous moment) is smaller than the predetermined threshold, meaning that the image of the second marked parking space may be captured by the image capturing device 10 for the first time as the vehicle 1 is moving, data associated with this second marked parking space has not been included in the tracking database 14. At this time, the marked parking space tracking unit 128 stores the data of the second marked parking space into the tracking database 14 for use in subsequent tracking.

When the continuous duration in which the second marked parking space is stored in the tracking database 14 is greater than a predetermined continuous storage time without update of the location information of the second marked parking space, meaning that the second marked parking space may have already left the capture screen of the image capturing device 10 a long time ago, the image capturing device 10 has stopped capturing the image of the second marked parking space a long time ago, and the parking space identification module 12 deletes the information of the second marked parking space stored in the tracking database 14 to conserve space in the tracking database 14.

Similarly, in some embodiments, when the continuous duration in which the first or second marked parking space is stored in the tracking database 14 is not greater than the predetermined continuous storage time and there is also no update on the location information of the parking space (the first marked parking space or the second marked parking space), meaning that the image capturing device 10 might be temporarily unable to capture continuous image data of the first or second marked parking space due to changes in light and shadow or sight obstruction, the marked parking space tracking unit 128 can initiate a tracking algorithm to calculate the location information of the parking space to help identifying the parking space.

In some embodiments, the marked parking space identification system according to the present disclosure further includes the image display device 16 electrically connected with the parking space identification module 12. The image display device 16 is capable of displaying the location information and images of the first marked parking space and the second marked parking space identified by the parking space identification module 12, wherein the image display device 16 can be a touch display device, such as a touch screen, to allow the driver to touch select the first marked parking space or the second marked parking space to facilitate subsequent parking of the vehicle 1 into the parking space.

Figure 6:
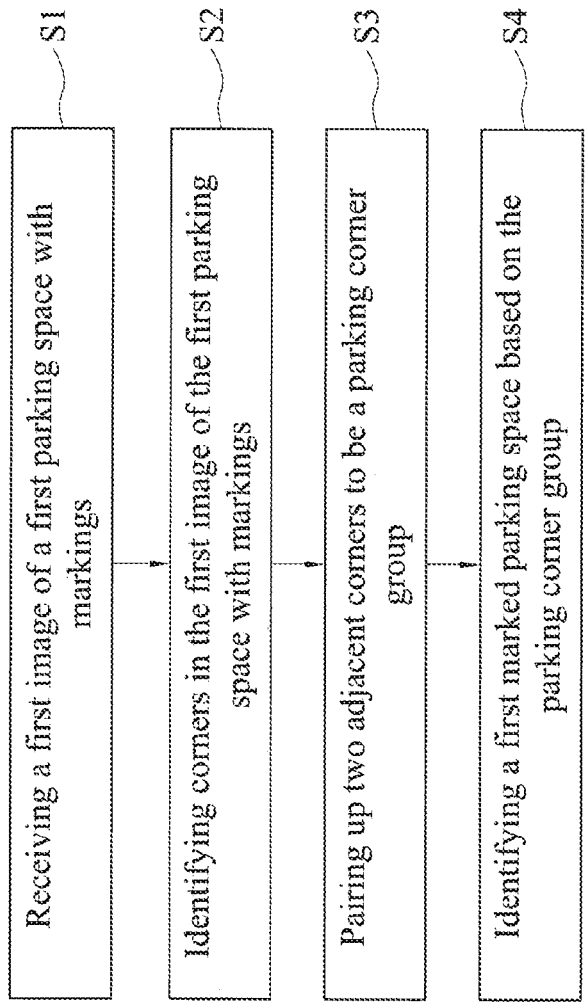
FIG. 6 is a flowchart illustrating a marked parking space identification method in accordance with an embodiment of the present disclosure.

FIG. 6 is a flowchart illustrating a marked parking space identification method in accordance with an embodiment of the present disclosure. An image including a first parking space P1 and its surrounding is captured by an image capturing device 10, and the location information of a first marked parking space and the relative distance between the first marked parking space and a vehicle 1 are identified by a parking space identification module 12. The identification of a parking space is described in details below using the first marked parking space as an example. However, the present disclosure may equally identify the first marked parking space and a second marked parking space simultaneously or just the second marked parking space.

Step S1: a first image of a first parking space with markings is received. In actual implementations, when a vehicle 1 approaches a first parking space P1, an image capturing device 10 captures an image of the first parking space P1 and its surrounding.

Step S2: a plurality of corners L1-L4 in the first image of the first parking space with markings are identified. The image capturing device 10 sends the image of the first parking space P1 and its surrounding to a parking space identification module 12, and the parking space identification module 12 uses the corner detector in a parking space marking feature detecting unit 122 to detect a plurality of corners L1-L4 on the first parking space P1.

Step S3: a parking corner group is formed by pairing-up two adjacent corners. After receiving the corner information, a left and right feature pairing unit 124 pairs up two adjacent corners with a specific corresponding relationship (e.g., corners L1 and L2) into a parking corner group, wherein the angles formed by the two adjacent corners should correspond and are supplementary angles.

Step S4: a first marked parking space is identified based on the parking corner group. For example, after receiving the parking corner group, a parking space determining unit 126 uses the relative location information of the parking corner group to set a first region of interest R1 encompassing said parking corner group in order to identify corner points of the corners L1 and L2 and their location information in the first region of interest R1 to determine the first marked parking space. In some other embodiments, the parking space determining unit 126 further includes identifying whether there is a line r1 between the two adjacent corners (e.g., corners L1 and L2) of the parking corner group within the first region of interest RE If so, the space delineated by the corners L1 and L2 and the line r1 is determined to be the first marked parking space.

The marked parking space identification method described above may further include calculating the location information of the first marked parking space based on space parameters and lens parameters of the vehicle 1 inputted in advance, and calculating the relative distance between the vehicle 1 and the first marked parking space to be used as a reference by the parking space identification module 12.

Figure 7:
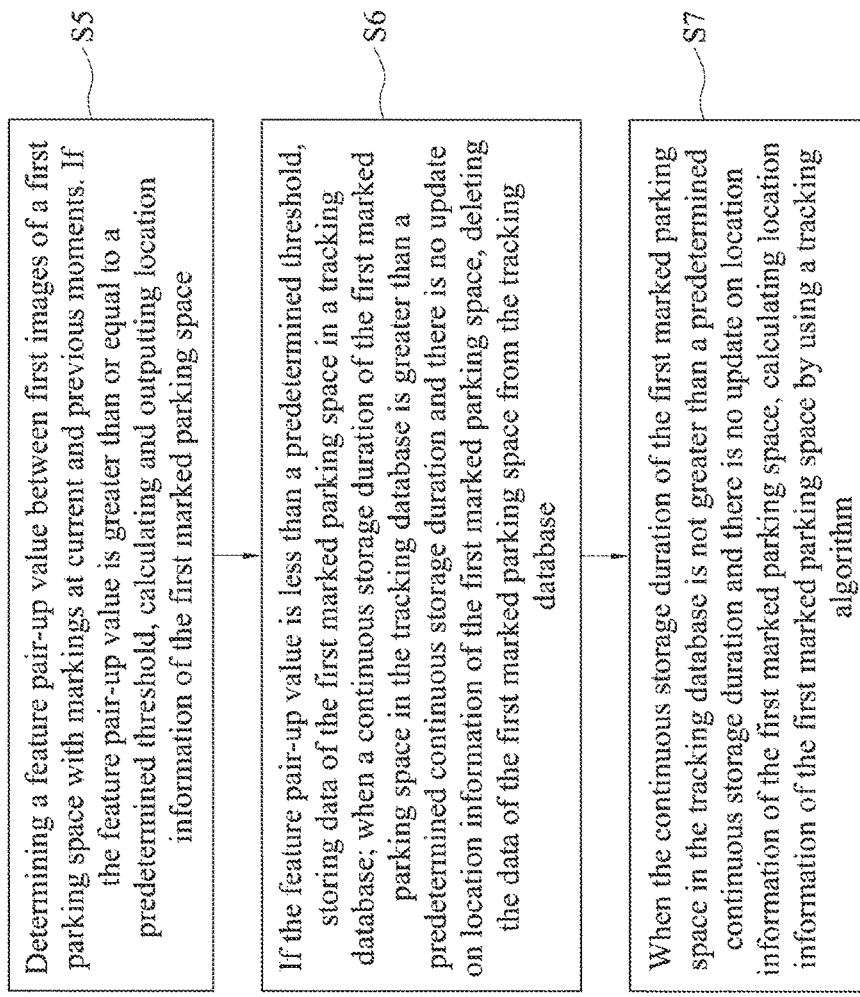
FIG. 7 is a flowchart illustrating a marked parking space identification method in accordance with another embodiment of the present disclosure.

The marked parking space identification method described above may further include, in addition to identifying a parking space, tracking a parking space, that is, subsequent tracking steps can be performed after step S4 of FIG. 6 as shown in FIG. 7, which is a second flowchart illustrating a marked parking space identification method in accordance with another embodiment the present disclosure.

Step 5: A feature pair-up value between the first image of the first parking space with markings at the current moment and the first image of the first parking space with markings at the previous moment is determined. If the feature pair-up value is greater than or equal to a predetermined threshold, the location information of the first marked parking space is calculated and outputted.

Step 6: If the feature pair-up value is less than a predetermined threshold, the data of the first marked parking space is stored in a tracking database 14. When the continuous storage duration of the first marked parking space in the tracking database 14 is greater than a predetermined continuous storage duration and there is no update on the location information of the first marked parking space, the data of the first marked parking space is deleted from the tracking database 14.

Step 7: When the continuous storage duration of the first marked parking space in the tracking database 14 is not greater than a predetermined continuous storage duration and there is no update on the location information of the first marked parking space, the location information of the first marked parking space is calculated by a tracking algorithm.

In addition to identifying only a "single" parking space, the marked parking space identification method described above may also identify "a plurality of" parking spaces in a similar way as described before. An identification method similar to that shown in FIG. 6 is used. The image capturing device 10 simultaneously captures an image including a first parking space P1 and a second parking space P2 and their surroundings. The parking space identification module 12 then uses the parking space marking feature detecting unit 122 and the left and right feature pairing unit 124 to identify and pair-up corners L1 and L2 of the first parking space P1 and corners L1' and L2' of the second parking space P2 into two parking corner groups. The parking space determining unit 126 further determines a first marked parking space and a second marked parking space based on the parking corner groups. Subsequently, a tracking method similar to that shown in FIG. 7 can be used. The parking space identification module 12 simultaneously tracks the first parking space P1 and the second parking space P2. In the case where the parking space identification module 12 is unable to identify a parking space based on the images, the marked parking space tracking unit 128 is used to obtain the location information of the first marked parking space and/or the second marked parking space to assist in the identification of the parking space.

In conclusion, the marked parking space identification system and marked parking space identification method proposed by the present disclosure first identify a plurality of corners of a parking space using the parking space marking feature detecting unit, then pair up two adjacent corners into a parking corner group using the left and right feature pairing unit, and finally determines a marked parking space based on the parking corner group using the parking space determining unit. With the above identification mechanism according to the present disclosure, not only a "single" parking space can be identified, but identification time and consumption of system resources can also be reduced as only the parking corner group needs to be identified.

In addition, with the marked parking space tracking unit, the present disclosure is capable of tracking a parking space. Even when a parking space cannot be identified temporarily due to conditions such as changes in light and shadow and sight obstruction, the relative distance between a marked parking space and the vehicle can still be calculated by imitating a tracking algorithm, thereby assisting the identification of the parking space.

Moreover, with the image display device (e.g., a touch display device), the present disclosure allows a marked parking space to be selected by the driver by tapping on the display screen when a plurality of parking spaces are identified by the parking space identification module. The image display device is capable of displaying the location information of the selected marked parking space and its image, providing reference for the driver when he is maneuvering the vehicle into the parking space.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A marked parking space identification method, comprising:
   receiving a first image of a first parking space with markings;
   identifying a plurality of corners in the first image of the first parking space with markings;
   pairing up two adjacent corners to be a parking corner group; and
   identifying a first marked parking space based on the parking corner group.

2. The marked parking space identification method of claim 1, wherein the two adjacent corners correspond to each other and are supplementary angles.

3. The marked parking space identification method of claim 1, further comprising determining a first region of interest based on the parking corner group, wherein the first marked parking space is determined within the first region of interest.

4. The marked parking space identification method of claim 3, further comprising identifying whether there is a line between the two adjacent corners of the parking corner group in the first region of interest; if so, determining a space delineated by the parking corner group and the line to be the first marked parking space.

5. The marked parking space identification method of claim 1, further comprising calculating location information of the first marked parking space based on a lens parameter inputted in advance.

6. The marked parking space identification method of claim 1, wherein the plurality of corners in the first image of the first parking space with markings are identified by a corner detector trained by using a machine learning algorithm.

7. The marked parking space identification method of claim 1, further comprising determining a feature pair-up value between the first image of the first parking space with markings at a current moment and the first image of the first parking space with markings at a previous moment.

8. The marked parking space identification method of claim 7, further comprising calculating and outputting location information of the first marked parking space at the current moment when the feature pair-up value is greater than or equal to a predetermined threshold.

9. The marked parking space identification method of claim 7, further comprising storing data associated with the first marked parking space in a tracking database when the feature pair-up value is less than a predetermined threshold, and calculating location information of the first marked parking space by using a tracking algorithm when a continuous storage duration of the data associated with the first marked parking space stored in the tracking database is not greater than a predetermined continuous storage duration and there has been no update on the location information of the first marked parking space.

10. The marked parking space identification method of claim 7, further comprising storing data associated with the first marked parking space in a tracking database when the feature pair-up value is less than a predetermined threshold, and deleting the data associated with the first marked parking space from the tracking database when a continuous storage duration of the data associated with the first marked parking space stored in the tracking database is greater than a predetermined continuous storage duration and there has been no update on the location information of the first marked parking space.

11. The marked parking space identification method of claim 1, further comprising:
   receiving a second image of the second parking space with markings;
   identifying a plurality of corners in the second image of the second parking space with markings;
   pairing up two adjacent corners to be a second parking corner group;
   identifying a second marked parking space based on the second parking corner group; and
   determining a first feature pair-up value between the first image of the first parking space with markings at a current moment and the first image of the first parking space with markings at a previous moment, and determining a second feature pair-up value between the second image of the second parking space with markings at the current moment and the second image of the second parking space with markings at the previous moment.

12. The marked parking space identification method of claim 11, further comprising calculating and outputting location information of the first marked parking space and the second marked parking space at the current moment when the first feature pair-up value and the second feature pair-up value are greater than or equal to a predetermined threshold.

13. The marked parking space identification method of claim 11, further comprising storing data associated with the second marked parking space in a tracking database when the second feature pair-up value is less than a predetermined threshold, and deleting the data associated with the second marked parking space from the tracking database when a continuous storage duration of the data associated with the second marked parking space stored in the tracking database is greater than a predetermined continuous storage duration and there has been no update on the location information of the second marked parking space.

14. The marked parking space identification method of claim 11, further comprising:
   receiving a plurality of other images of other marking spaces with markings;
   identifying a plurality of corners in each of the other images of the other marking spaces with markings;
   identifying other marked parking spaces based on the plurality of corners; and
   tracking each of the other marked parking spaces.

15. A marked parking space identification system, comprising:
   at least an image capturing device configured for capturing a first image of a first parking space with markings; and
   a parking space identification module electrically connected with the image capturing device and configured for performing a marked parking space identification method, wherein the marked parking space identification method includes:
      receiving the first image of the first parking space with markings;
      identifying a plurality of corners in the first image of the first parking space with markings;
      pairing up two adjacent corners to be a parking corner group; and
      identifying a first marked parking space based on the parking corner group.

16. The marked parking space identification system of claim 15, wherein the parking space identification module includes a parking space marking feature detecting unit, and the parking space marking feature detecting unit includes a corner detector configured for identifying the plurality of corners.

17. The marked parking space identification system of claim 15, wherein the parking space identification module includes a left and right feature pairing unit configured for pairing up the two adjacent corners into the parking corner group.

18. The marked parking space identification system of claim 15, wherein the parking space identification module includes a parking space determining unit configured for determining and calculating location information of the first marked parking space.

19. The marked parking space identification system of claim 18, wherein the parking space determining unit determines a first region of interest based on the parking corner group.

20. The marked parking space identification system of claim 15, wherein the parking space identification module includes a marked parking space tracking unit configured for tracking the first marked parking space.

21. The marked parking space identification system of claim 15, further comprising an image display device electrically connected with the parking space identification module and configured for displaying location information and image of the first marked parking space.

22. The marked parking space identification system of claim 21, wherein the image display device includes a touch display device.

* * * * *